(12) United States Patent
Morgan et al.

(10) Patent No.: US 6,581,524 B1
(45) Date of Patent: *Jun. 24, 2003

(54) CONVERSION DEVICE FOR CONVERTING A ROTATIONAL MOTION INTO A RECIPROCAL MOTION

(75) Inventors: John Morgan, Everton Park (AU); Peter Youngman, Arana Hills (AU)

(73) Assignee: Harsco Technologies Corporation, Fairmont, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/121,413

(22) Filed: Apr. 12, 2002

Related U.S. Application Data

(63) Continuation of application No. 09/614,999, filed on Jul. 12, 2000, now Pat. No. 6,386,114.

(51) Int. Cl.$^7$ ............................................. E01B 27/00
(52) U.S. Cl. ........................... 104/10; 104/13; 74/25; 404/133; 173/210
(58) Field of Search ...................... 104/13, 14, 10, 104/12; 173/210, 122; 404/133, 102, 103, 113; 74/25, 54, 570

(56) References Cited

U.S. PATENT DOCUMENTS

| | | | |
|---|---|---|---|
| 780,130 A | * | 1/1905 | Salzer et al. .................. 74/55 |
| 798,416 A | * | 8/1905 | Jackson ...................... 173/110 |
| 1,399,387 A | | 12/1921 | Jackson |
| 1,464,570 A | * | 8/1923 | Hage .......................... 173/98 |
| 1,621,103 A | | 3/1927 | Brumell |
| 1,932,723 A | | 10/1933 | Brown |
| 2,079,909 A | | 5/1937 | Jackson |
| 2,201,023 A | | 5/1940 | Brown |
| 3,856,426 A | | 12/1974 | Waschulewski et al. |
| 4,014,620 A | | 3/1977 | Vural et al. |
| 4,048,891 A | * | 9/1977 | Pearl .......................... 83/528 |
| 4,069,763 A | | 1/1978 | Theurer |
| 4,240,352 A | | 12/1980 | Theurer |
| 4,642,839 A | * | 2/1987 | Urban ........................ 101/157 |
| 4,660,482 A | * | 4/1987 | Skogward .................... 112/241 |
| 5,031,542 A | | 7/1991 | Theurer |
| 5,343,810 A | | 9/1994 | Theurer |
| 6,360,639 B1 | * | 3/2002 | Gerber ....................... 451/423 |

\* cited by examiner

Primary Examiner—S. Joseph Morano
Assistant Examiner—Frantz F. Jules
(74) Attorney, Agent, or Firm—David C. Jenkins; Eckert Seamans Cherin & Mellott, LLC

(57) ABSTRACT

A conversion device that is structured to be coupled to the rotating axle of a motor and to an output assembly. The output assembly has an elongated shaft with an axis extending generally perpendicular to the axis of the motor axle. The output assembly further is coupled to a frame to resist movement in an axial direction. The conversion device includes an eccentric hub having a disk with a sidewall extending from the perimeter thereby forming a recess and a yoke having a shaft and an attachment pin. The disk is coupled to the motor axle. The yoke shaft is disposed within the eccentric hub recess and the attachment pin is pivotally coupled to the output assembly. As the eccentric hub is rotated by the motor, the hub causes the yoke moves in a circular path. The circular path of the yoke has directional components that are parallel to the axis of the output assembly shaft and perpendicular to the axis of the output assembly shaft. The attachment pin allows the yoke to pivot in a direction parallel to the axis of the output assembly shaft. Thus, only the motion perpendicular to the axis of the output assembly shaft is transferred to the output assembly shaft. This motion is a reciprocal rotational motion about the axis of the output assembly shaft.

11 Claims, 7 Drawing Sheets

CONVERSION DEVICE FOR CONVERTING A ROTATIONAL MOTION INTO A RECIPROCAL MOTION

CROSS REFERENCE TO RELATED APPLICATIONS

This application is a continuation of U.S. patent application Ser. No. 09/614,999, filed Jul. 12, 2000 now U.S. Pat. No. 6,386,114.

BACKGROUND OF THE INVENTION

1. Field of the Invention

This invention relates to a conversion device for converting the rotational motion of a motor shaft into a reciprocating motion and, more specifically, to a conversion device that utilizes an eccentric hub disposed between the motor and the output assembly.

2. Description of the Prior Art

The ballast underlying a railroad track must be compressed during the installation of new track or repairing old track. The typical means for compressing the railroad track ballast is to vibrate and/or tamp the ballast using a tamping machine. A tamping machine typically consists of two pairs of tamping tools connected to a common vibrating device. The vibrating device causes the tamping tools to oscillate rapidly about the axis of an output shaft. This vibration allows the tamping tools to penetrate the ballast bed. The vibration device operates by imparting a vibration into the ballast particles. This vibration creates a liquidification of the particles thereby allowing the tamping tools to move into the ballast. The tools then move in a squeezing motion to compact the ballast into a closely packed mass that is better able to support the track structure.

There is, therefore, a need for a conversion device for converting the rotational motion of a motor shaft into a reciprocating motion in an output assembly.

There is a further need for an assembly for converting a rotational motion along a first axis to a reciprocating rotational motion along an axis perpendicular to the first axis.

SUMMARY OF THE INVENTION

These needs and others are satisfied by the invention which provides for a conversion device having an eccentric hub disposed at the connection between a motor and the output assembly. The eccentric hub is generally cup-shaped and includes a circular sidewall having an inner bearing surface and an outer bearing surface. The sidewall has a thin portion and a thick portion disposed generally 180 degrees apart. The sidewall gradually decreases in thickness between the thick portion and the thin portion. The eccentric hub is coupled to a rotating output axle on the motor.

The output assembly includes a yoke and a shaft. The yoke includes a shaft that has an axis that is, preferably, about perpendicular to the axis of the output assembly shaft. The yoke shaft is pivotably coupled to the output shaft by a pivot pin that extends perpendicular to the axis of the output shaft and perpendicular to the yoke shaft. The output assembly shaft is coupled to a frame and may rotate axially, but is restrained from moving in an axial direction.

The output assembly shaft is generally perpendicular to the motor shaft. The yoke shaft is disposed within, and is coupled to, the eccentric hub. Thus, when the motor is actuated, the eccentric hub rotates. As the thick side of the side wall moves around the hub, the yoke shaft moves in response to the eccentric shape. One component of the yoke shaft's motion is, in turn, imparted to the output assembly shaft. That is, the eccentric shape of the hub moves the yoke shaft in directions both parallel and perpendicular to the output shaft axis. The parallel component of this motion is not transferred to the output shaft as the yoke pivot pin allows the yoke shaft to pivot in the axial direction of the output assembly shaft. Thus, the only component of the yoke motion transferred to the output shaft is the horizontal component. This motion causes the output shaft to move in a reciprocal rotational motion about the output assembly shaft axis.

It is an object of this invention to provide a device for converting the rotational motion of a motor shaft to a reciprocal motion in an output assembly.

It is a further object of this invention to provide a device for converting the rotational motion of a motor shaft to a reciprocal motion in an output assembly that includes an eccentric hub.

BRIEF DESCRIPTION OF THE FIGURES

A full understanding of the invention can be gained from the following description of the preferred embodiments when read in conjunction with the accompanying drawings in which.

DESCRIPTION OF THE PREFERRED EMBODIMENTS

The conversion device 50 (described below) translates a rotational motion from a motor axle 40 to a reciprocal rotational motion about the axis of an output assembly. The output assembly includes a shaft and is described below as a tamper tool shaft 90. The out put assembly may, however, be any type of shaft.

Figure 1:
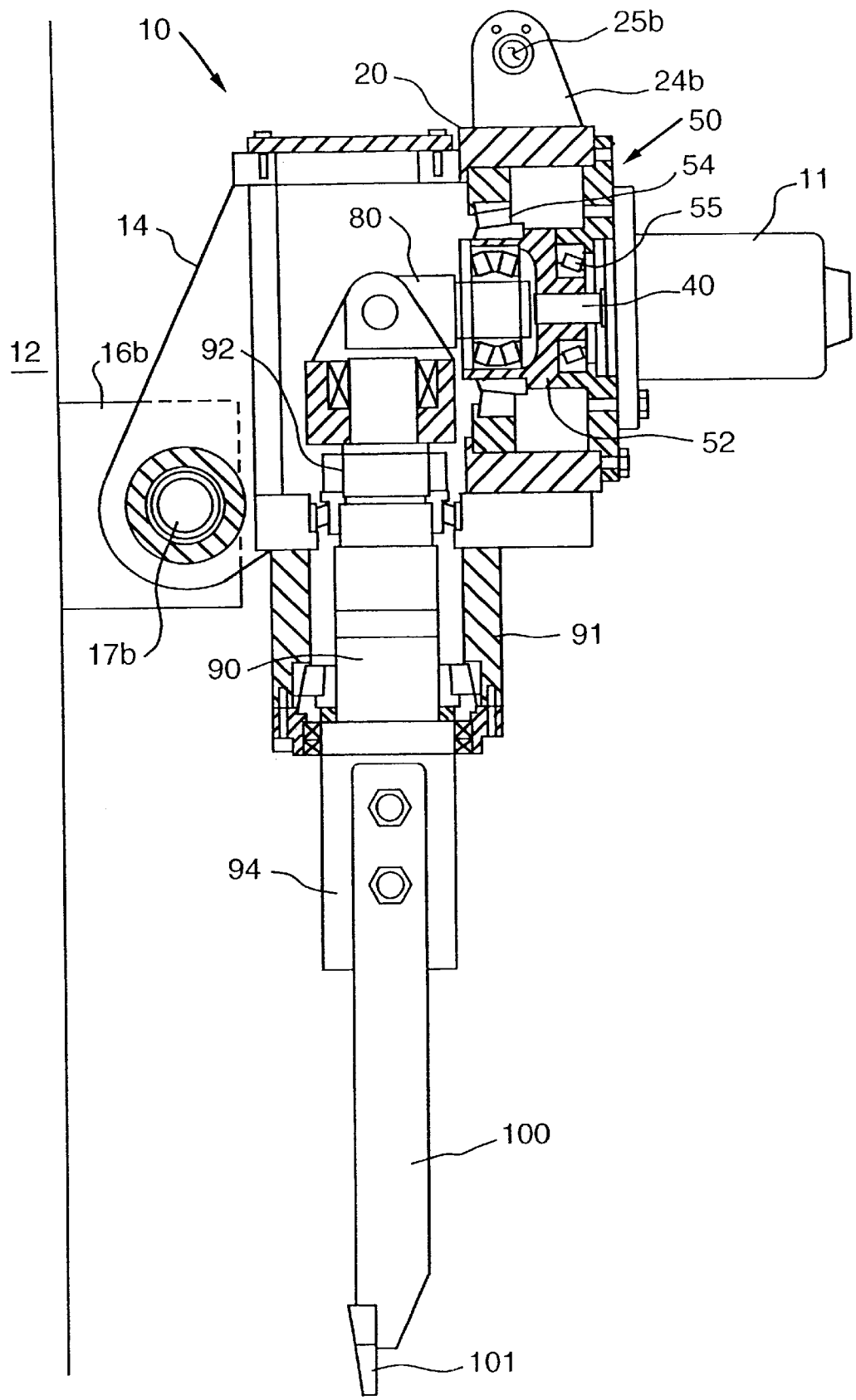
FIG. 1 shows a partial cross-sectional side elevation view of a split tool tamper according to the present invention.
Figure 4:
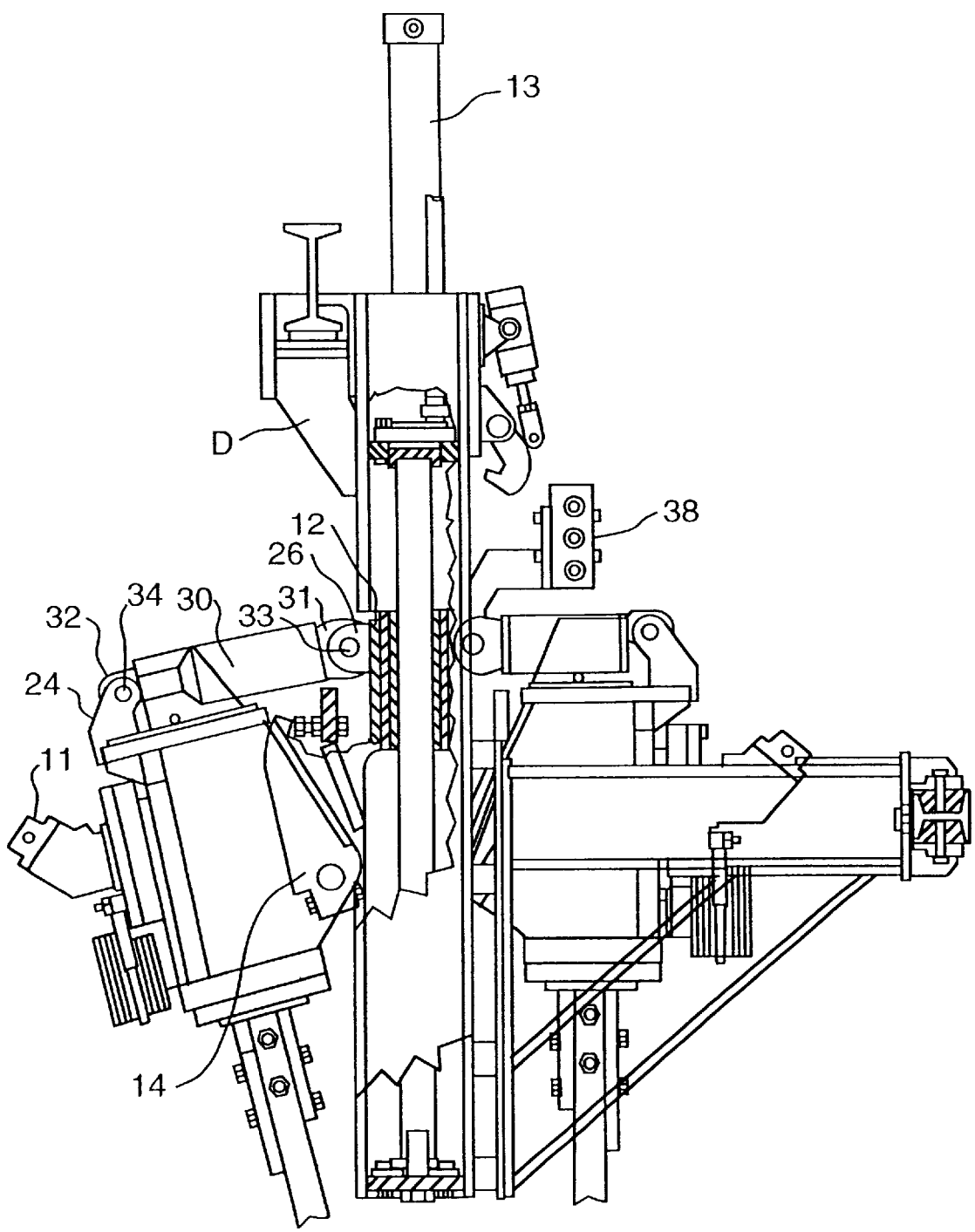
FIG. 4 is a side view showing the split tool tamper attached to a frame.

As shown in FIG. 1, the split tool tamper 10 of the present invention includes a motor 11, such as a hydraulic motor, a conversion device 50, and a single tool shaft 90. The split tool tamper 10 may be pivotally attached to a generally vertical frame 12. The frame 12 may be attached to vertical translation means, such as a hydraulic piston 13 (FIG. 4). The vertical translation means may be coupled to a railroad car (not shown) or other suitable vehicle which may travel over a railroad ballast bed. The conversion device 50 is enclosed with in a housing 20. The split tool tamper 10 further includes a tool shaft 90 and a tamping tool 100. The tool shaft 90 is enclosed within output shaft housing 91.

Figure 2:
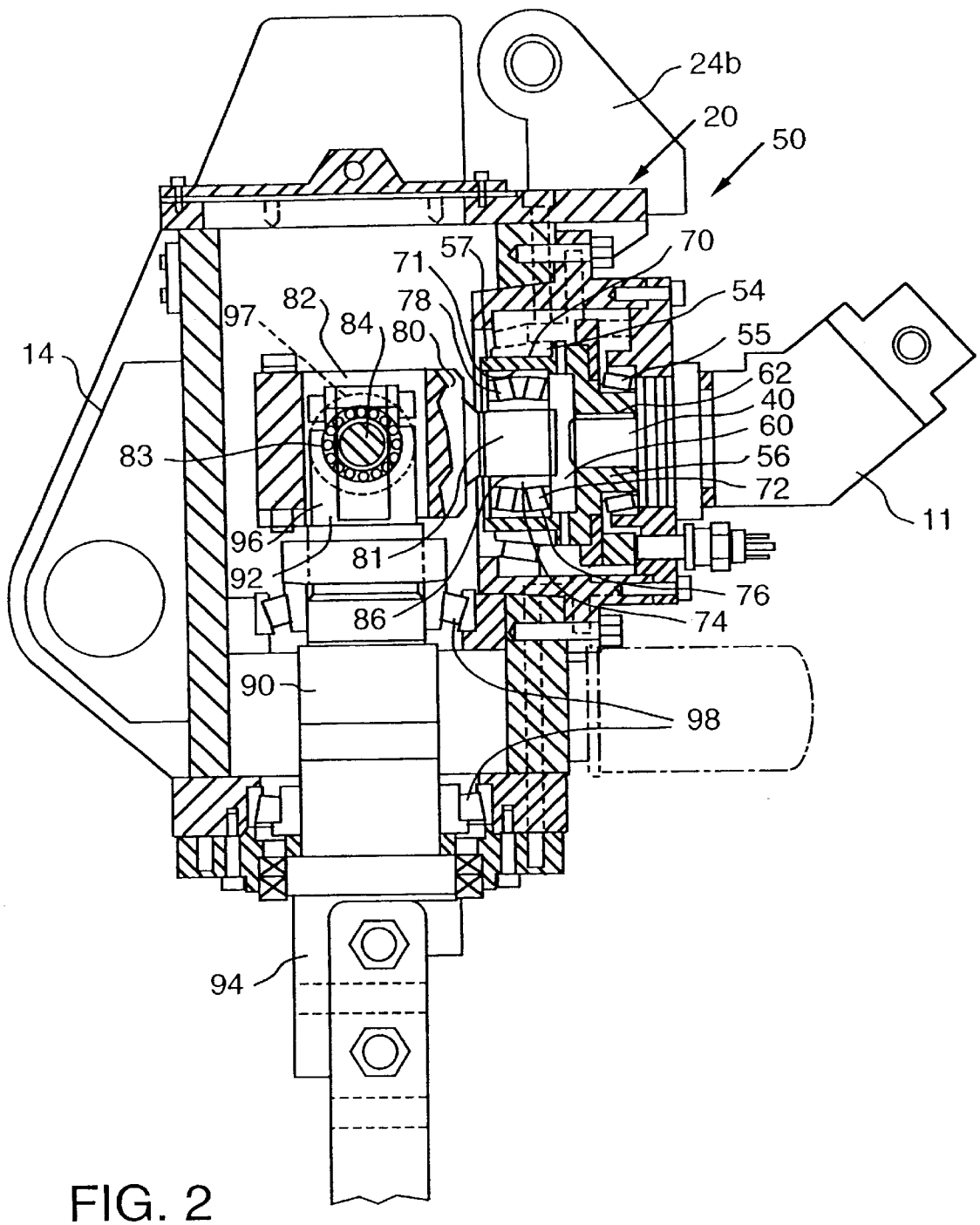
FIG. 2 is a partial cross-sectional view detail of the upper portion of the split tool tamper.
Figure 3:
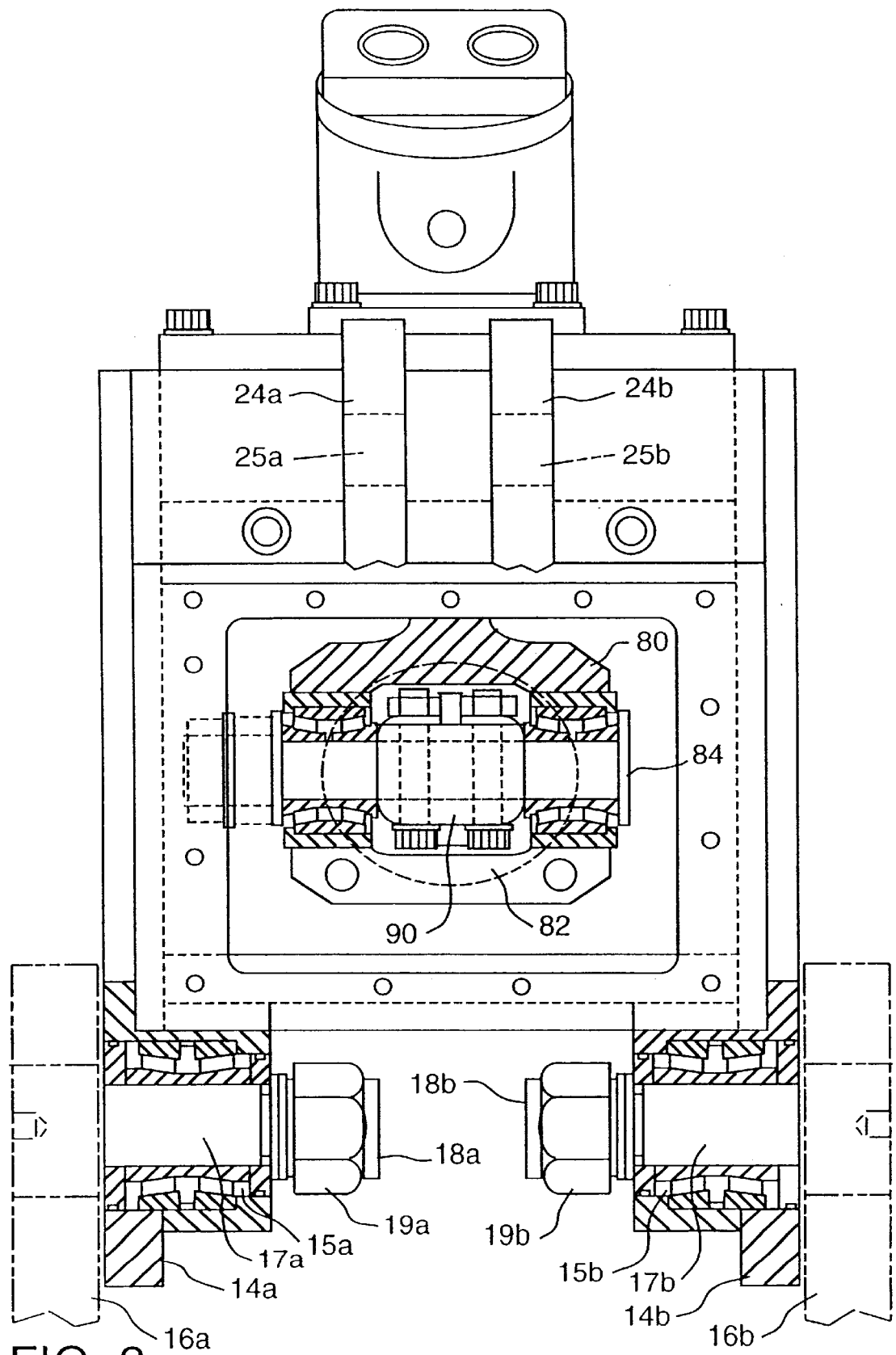
FIG. 3 is a partial cross-sectional top view of the split tool tamper.

The housing 20 may include a lower mounting protrusion 14 and an upper mounting protrusion 24. As shown in FIGS. 2–4, lower mounting protrusion 14 may be a pair of tabs 14a, 14b (FIG. 3). Each tab 14a, 14b includes an opening 15a, 15b therethrough. Frame 12 includes a pair of mounting tabs 16a, 16b which are sized and spaced to correspond to housing tabs 14a, 14b. Each frame tab includes an opening therethrough. A pin 17a, 17b having a threaded end 18a, 18b passes through each frame tab 16a, 16b, and housing tab 14a, 14b. A nut 19a, 19b engages threaded ends 18a, 18b thereby pivotally mounting housing 20 to frame 12.

The housing 20 is further connected to frame 12 at upper mounting protrusion 24. Upper mounting protrusion 24 may have tabs 24a, 24b each having an opening 25a, 25b therethrough. Frame 12 includes an upper frame tab 26 proximal to the upper mounting protrusion 24. The upper frame tab 26 includes an opening therethrough. An extension member 30, such as a hydraulic cylinder, extends between frame 12 and upper mounting protrusion 24. The extension member 30 includes a first coupling end 31 and second coupling end 32. The coupling ends 31, 32 may have an opening for a pin. The extension member 30 may be coupled to frame 12 by mounting pins 33, 34. As shown, mounting pin 33 is disposed through the opening in the first coupling end 31 and tab 26. The other mounting pin 34 is disposed in the second coupling end 32 and openings 25a, 25b. The extension member 30 has a first, closed position and a second, maximum extended position. Preferably, the split tool tamper may be angled 0 to 13 degrees from vertical by extending the extension member 30. In the first, closed position, extension member is structured to align tool shaft 90 substantially parallel to frame 12. In the second, extended position, extension member 30 causes housing 20 to rotate clockwise, as shown in FIG. 1, about mounting pins 17a, 17b so that tool shaft 90 is angled downwardly and inwardly relative to frame 12. The extension member may be coupled to a hydraulic system 38 which can cause extension member 30 to move between the first and second position approximately every three seconds.

Motor 11 includes a rotating output axle 40 having a generally horizontal axis when extension member 30 is in the first position. Rotating output axle 40 is connected to conversion device 50. As is well know in the prior art, motor 11 rotates output axle 40 around the generally horizontal axis. Preferably, the motor 11 will rotate output axle 40 at about 3000 R.P.M. As described below, the motor 11 in conjunction with conversion device 50 creates a reciprocating rotational motion in tool shaft 90.

As shown in FIGS. 1 and 2, conversion device 50 includes an eccentric hub 52 having a generally horizontal axis and an eccentric hub mounting means, such as a first roller bearing 54 and a second roller bearing 55. The eccentric hub mounting means 54 extends between housing 20 and outer bearing surface 70 (described below). The eccentric hub 52 is generally cup-shaped having a disk 56 with a sidewall 57 extending from the perimeter of the disk 56. The sidewall 57 forms a recess 60 having an open face. Disk 56 is generally circular and includes a medial opening 62 therethrough. Sidewall 57 includes a thick portion 64 and a thin portion 66. Thick portion 64 is located on the opposite side of disk 56 from thin portion 66. Sidewall 57 gradually decreases in thickness from thick portion 64 to thin portion 66. The sidewall outer surface is an outer bearing surface 70. The sidewall 57 also includes an inner wall which forms an inner bearing surface 71.

The conversion device 50 further includes a spherical roller bearing 72. Spherical roller bearing 72 is a toroid having a medial opening 74 and an outer bearing surface 76. Roller bearing 72 is disposed within the eccentric hub recess 60. Roller bearing outer surface 76 contacts sidewall inner bearing surface 71. Spherical roller bearing 72 also includes an inner bearing surface 78.

The conversion device 50 further includes a yoke 80 having a shaft 81, a vertical cavity 82 and a horizontal pin opening 83. Shaft 81 includes an outer bearing surface 86. Shaft 81 is disposed within roller bearing medial hole 74 with bearing surface 86 contacting roller bearing inner bearing surface 78. An attachment pin 84 is disposed in horizontal pin opening 83.

Tool shaft 90 includes an upper end 92 and a lower end 94. Upper end 92 forms a mounting bracket 96 having an opening 97 therethrough. Tool shaft opening 97 is sized to engage attachment pin 84. Shaft lower end 94 includes a tamping tool 100. The tamping tool 100 has a lower end 101 that is structured to contact railroad ballast. Tool shaft 90 is supported in housing 20 by two spaced bearings 98. Tool shaft 90 is supported by bearings 98 so that tool shaft 90 extends generally perpendicular to rotating axle 40.

As noted above, the split tool tamper 10 is pivotably mounted on a frame 12 by mounting pins 17a and 17b. The frame 12 is coupled by a hydraulic piston to railroad vehicle (not shown) so that the axis of mounting pins 17a and 17b extend generally in a direction perpendicular to the direction of the railroad rail. When extension member 30 is in the closed position, the axis of rotating axle 40 extends in a direction generally normal to the axis of mounting pins 17a and 17b. The axis of eccentric hub 52, which is attached to rotating axle 40, and roller bearing 72, which is disposed inside eccentric hub 52, also extend in a direction generally normal to the axis of mounting pins 17a and 17b. The shaft 81 is disposed within roller bearing 72, extending in a direction generally normal to the axis of mounting pins 17a and 17b. The yoke 80 may be positioned so that the axis of attachment pin 84 extends in a direction generally parallel to the axis of mounting pins 17a and 17b. Mounting bracket 96 is coupled to the conversion device 50 by passing attachment pin 84 through horizontal pin opening 83. When so configured, and when extension member 30 is in the first position, tool shaft 90 extends in a generally vertical direction. The angle of tool shaft 90 may be changed by extending extension member 30 to any point up to, and including, the maximum extended position of extension member 30. As noted above, the split tool tamper 10, preferably, may be angled 0 to 13 degrees from vertical.

In operation, motor 11 provides a rotational force to rotating axle 40. Rotating axle 40 rotates eccentric hub 52. Due to the eccentric shape of eccentric hub 52, the axis of eccentric hub 52 is reciprocated horizontally and vertically as axle 40 is rotated. Roller bearing 72, which is disposed within eccentric hub 52, is thereby reciprocated horizontally and vertically. The reciprocal motion of eccentric hub 52 is transferred from the roller bearing 72 to the shaft 81, yoke 80 and attachment pin 84, into tool shaft 90. The vertical position of tool shaft 90 is maintained by bearings 98. Thus, yoke 80 will pivot reciprocate in a vertical direction about pin 84. The horizontal reciprocation, however, is transferred to tool shaft 90 as described below.

Figure 5:
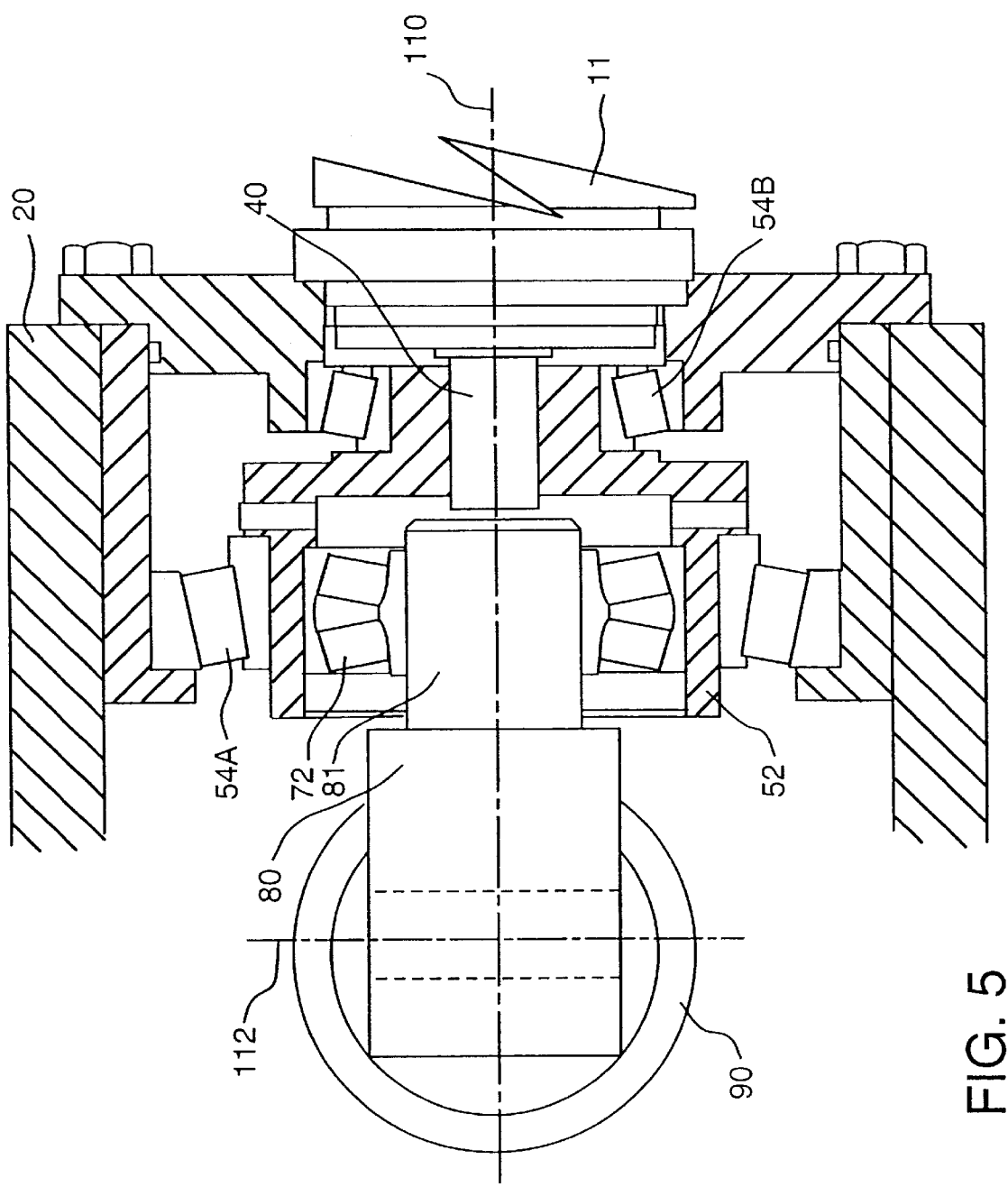
FIG. 5 is a schematic top view of the split tool tamper with the eccentric hub in the twelve o'clock position.
Figure 6:
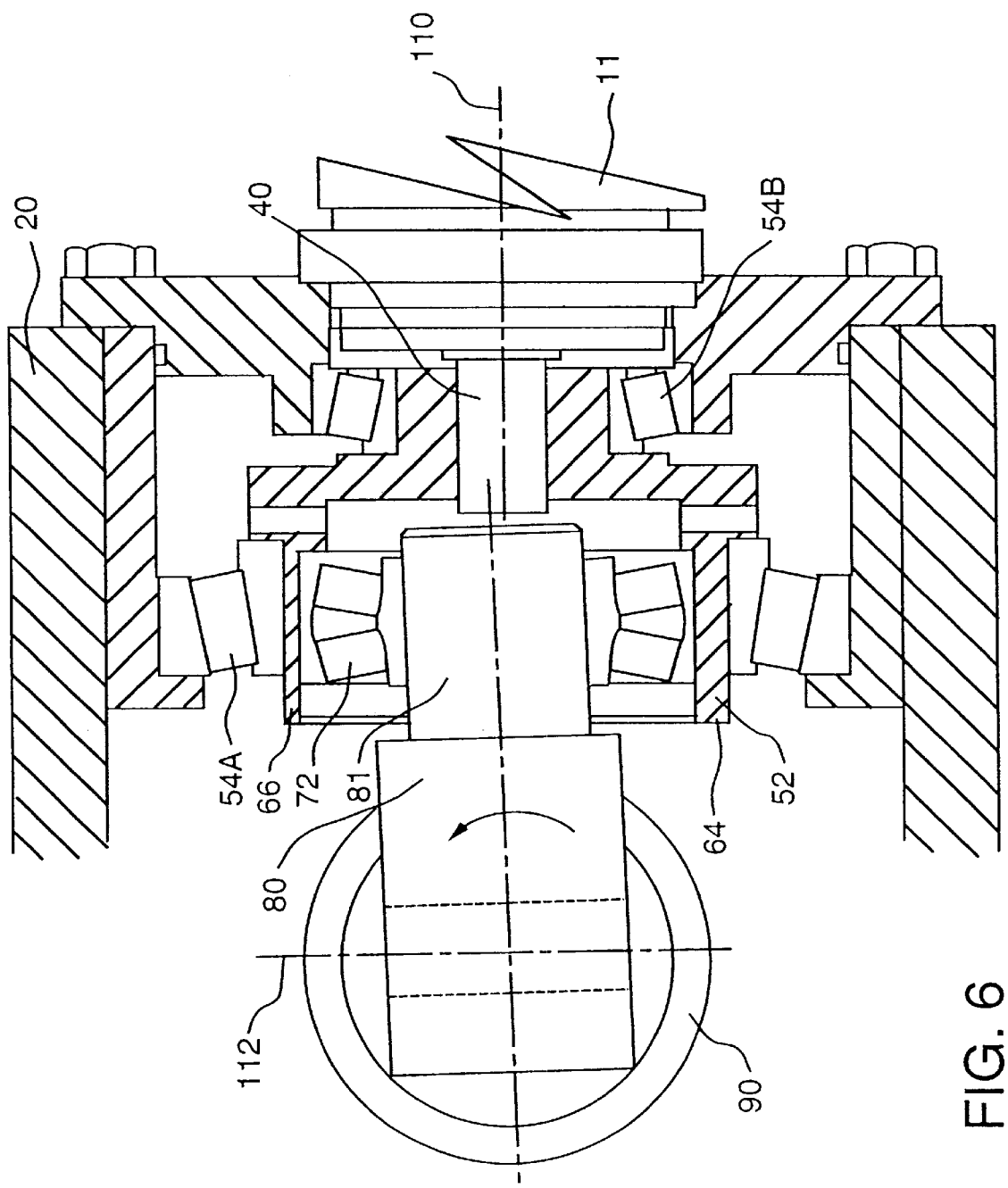
FIG. 6 is a schematic top view of the split tool tamper with the eccentric hub in the three o'clock position.

For the sake of this discussion the location of the eccentric hub sidewall thick portion 64 will correlate to a clock's hour hand. Thus, when the eccentric hub 52 is described as being in the twelve o'clock position, sidewall thick portion 64 is in the upper most position. As shown in FIG. 5, the eccentric hub 52 is in the twelve o'clock position. When the eccentric hub 52 is in this position, the axis of shaft 81 and the axis of axle 40, when seen from above, are aligned. As shown in FIG. 6, when the eccentric hub 52 is in the three o'clock position, the axis of shaft 81, when seen from above, is offset approximately 2.5 degrees in a counter-clockwise direction from the axis of axle 40, as measured from the axis of shaft

Figure 7:
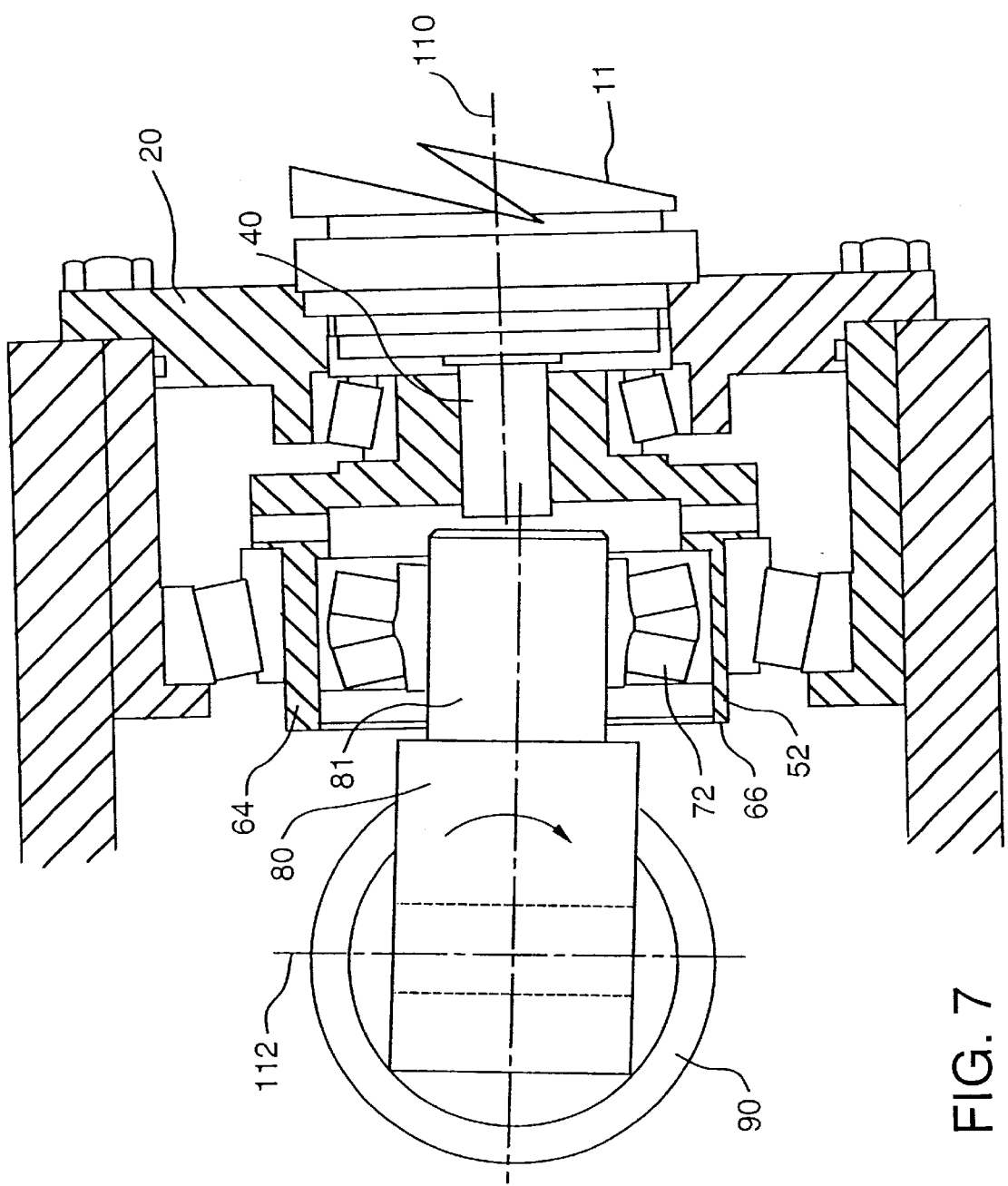
FIG. 7 is a schematic top view of the split tool tamper with the eccentric hub in the nine o'clock position.

90. When the eccentric hub is in the 6:00 o'clock position (not shown) the axis of shaft 81 and the axis of axle 40, when seen from above, are aligned. As shown in FIG. 7, when the eccentric hub 52 is in the nine o'clock position, the axis of shaft 81, when seen from above, is offset approximately 2.5 degrees in a clockwise direction from the axis of axle 40, as measured from the axis of shaft 90. Thus, rotation of eccentric hub 52 results in a reciprocal rotational motion in tool shaft 90.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. As used in the appended claims, "coupled," means a linkage, direct or indirect, so long as a linkage occurs.

What is claimed is:

1. A conversion device structured to be coupled to a rotating axle of a motor and to an output assembly, said output assembly having an elongated shaft with an axis extending generally perpendicular to the axis of said motor axle, said output assembly further being coupled to a frame to resist movements in an axial direction, said conversion device comprising:

an eccentric hub having a disk with medial opening, a perimeter, and a sidewall extending from said perimeter forming a recess;

said disk medial opening structured to be coupled to said motor axle;

a yoke having a shaft with an axis and an attachment pin;

said yoke shaft disposed within said eccentric hub recess;

said attachment pin pivotally coupled to said output assembly; and wherein rotation of said disk causes said yoke shaft axis to move in a reciprocal motion between opposite sides of said medial opening.

2. The conversion device of claim 1, wherein:

said sidewall includes a thick portion and a thin portion; and said thick portion and said thin portion disposed on generally opposite side of said disk.

3. The conversion device of claim 2, wherein the transition along said sidewall from said thick portion to said thin portion is gradual.

4. The conversion device of claim 3, wherein:

said sidewall has an inner bearing surface and an outer bearing surface; and said yoke shaft coupled to said inner bearing surface.

5. The conversion device of claim 1, wherein said attachment pin axis extend generally perpendicularly to the axis of said yoke shaft and generally perpendicularly to the axis of said output assembly.

6. A conversion device structured to be coupled to the rotating axle of a motor and to an output assembly, said output assembly having an elongated shaft with an axis extending generally perpendicular to the axis of said motor axle, said output assembly further being coupled to a frame to resist movement in an axial direction, said conversion device comprising:

an eccentric hub having a disk with a perimeter and a sidewall extending from said perimeter forming a recess;

said disk structured to be coupled to said motor axle;

a yoke having a shaft and an attachment pin;

said yoke shaft disposed within said eccentric hub recess;

said attachment pin pivotally coupled to said output assembly;

said sidewall includes a thick portion and a thin portion;

said thick portion and said thin portion disposed on generally opposite side of said disk;

wherein the transition along said sidewall from said thick portion to said thin portion is gradual;

said sidewall has an inner bearing surface and an outer bearing surface;

said yoke shaft coupled to said inner bearing surface; and wherein said outer bearing surface is a constant distance from the axis of said disk and said inner bearing surface is further from the axis of said disk at said thin portion and closer to the axis of said disk at said thick portion.

7. An assembly for converting a rotational motion along a first axis to a reciprocating rotational motion along an axis perpendicular to the first axis, said assembly comprising:

a frame;

a motor having an output axle structured to rotate about a first axis;

said motor coupled to said frame;

an output assembly having an elongated shaft with an axis extending generally perpendicular to said axle axis;

said output assembly coupled to said frame and structured to rotate axially and be restrained from moving in an axial direction;

a conversion device coupled to said axle and to said output assembly shaft, said conversion device comprising:

an eccentric hub having a disk with a perimeter, and a sidewall extending from said perimeter forming a recess;

said disk coupled to said motor axle;

a yoke having a shaft and an attachment pin;

said yoke shaft disposed within said eccentric hub recess;

said attachment pin pivotally coupled to said output assembly;

a first roller bearing disposed between said frame and said eccentric hub; and a spherical bearing disposed between said yoke shaft and said sidewall.

8. The assembly of claim 7, wherein the transition along said sidewall from said thick portion to said thin portion is gradual.

9. The assembly of claim 8, wherein:

said sidewall has an inner bearing surface and an outer bearing surface;

said spherical bearing shaft coupled to said inner bearing surface; and said yoke coupled to said spherical bearing.

10. The assembly of claim 9, wherein said outer bearing surface is a constant distance from the axis of said disk and said inner bearing surface is further from the axis of said disk at said thin portion and closer to the axis of said disk at said thick portion.

11. The assembly of claim 7, wherein said attachment pin axis extend generally perpendicularly to the axis of said yoke shaft and generally perpendicularly to the axis of said output assembly.

* * * * *